July 21, 1959      W. B. DANCY ET AL      2,895,794
PROCESS FOR RECOVERING POTASSIUM VALUES FROM KAINITE
Filed May 3, 1955
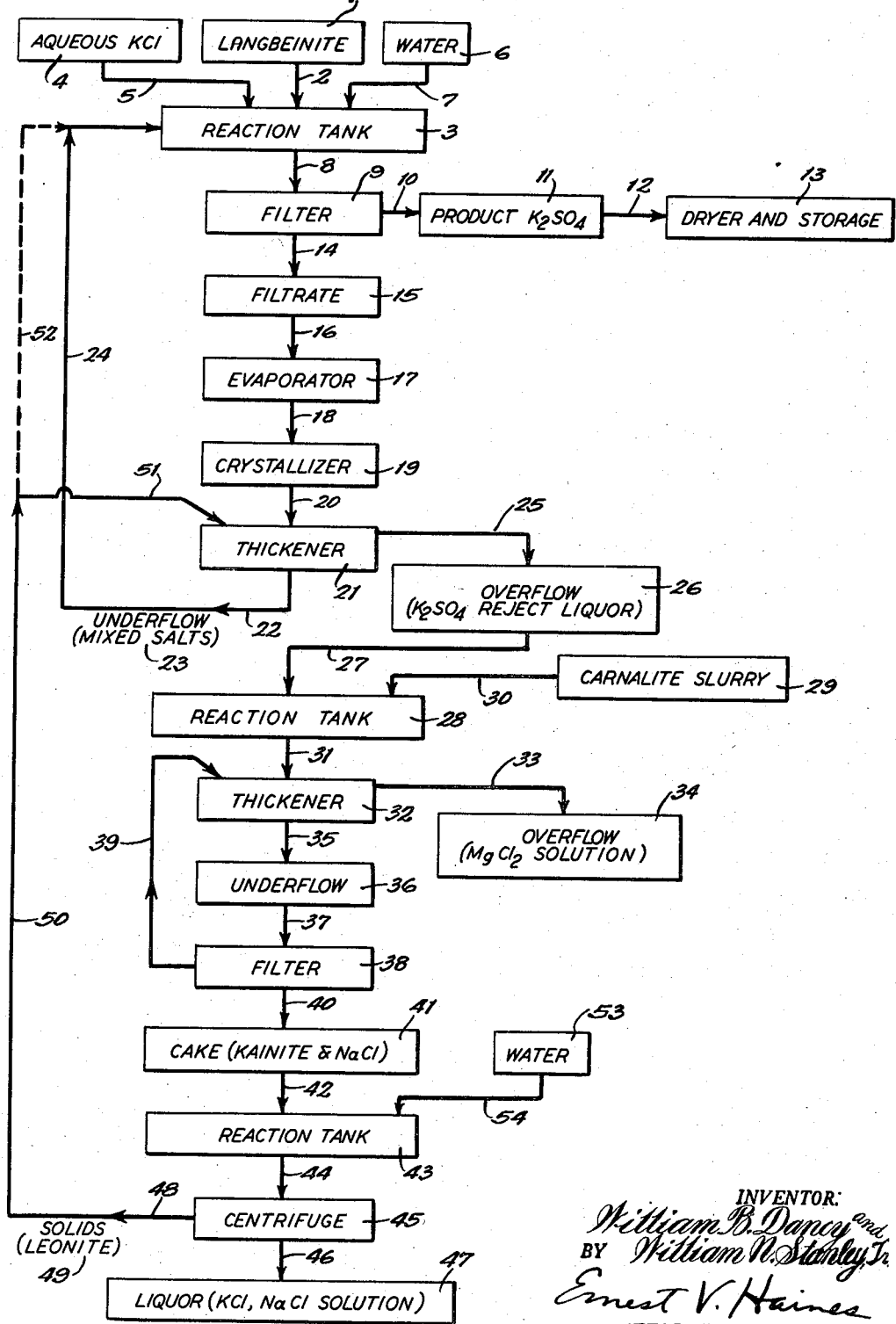

United States Patent Office 2,895,794
Patented July 21, 1959

2,895,794
PROCESS FOR RECOVERING POTASSIUM VALUES FROM KAINITE

William B. Dancy and William N. Stanley, Jr., Carlsbad, N. Mex., assignors to International Minerals & Chemical Corporation, a corporation of New York Application May 3, 1955, Serial No. 505,622

3 Claims. (Cl. 23—38)

The present invention relates to a process for the treatment of liquors to recover potassium values therefrom and, more particularly, to a process for recovering potassium and magnesium values from potassium sulfate reject liquor.

In the past, processes have been developed involving the production of potassium sulfate over and above the quantities naturally present in langbeinite, a naturally occurring potash mineral having the composition $$K_2SO_4 \cdot 2MgSO_4$$

by reacting an aqueous solution or slurry of potassium chloride substantially free from sodium chloride with leonite and/or schoenite having the formulae, respectively, $K_2SO_4 \cdot MgSO_4 \cdot 4H_2O$ and $K_2SO_4 \cdot MgSO_4 \cdot 6H_2O$, to produce potassium sulfat and a potassium-containing mother liquor. The leonite and schoenite are produced by reacting langbeinite substantially free of sodium chloride with the mother liquor separated from the potassium sulfate crystals. In this manner a portion of the potassium content of the high potassium-containing mother liquor is recovered by the production of the solid salts, leonite and schoenite, which can be used in the reaction step with potassium chloride to produce potassium sulfate. As practiced in the past, these processes have necessarily involved the use of reactants which are substantially free of sodium chloride, but it is necessary to follow a complicated system for handling the intermediate solids and liquors as outlined in processes, such as those disclosed by U.S. Patent 2,295,257 to Butt. In addition, concentrations of sodium chloride, such as are present as impurities in commercially available langbeinite and 60% muriate of potash, seriously reduce the overall recoveries when practicing the processes heretofore known. It has been found in practice that actual recoveries of the order of between about 65% and about 70% of the K₂O values of the raw materials are about as high as can be expected by following the processes heretofore practiced.

U.S. Patent 2,684,285 discloses a process which is an improvement over the process of U.S. Patent 2,295,257. The former patent concerns a process whereby the "potassium sulfate mother liquor" obtained, following a reaction between langbeinite and aqueous potassium chloride to produce potassium sulfate, and the removal of potassium sulfate from the reaction mixture, is concentrated and evaporated to produce certain mixed salts, namely, potassium chloride and leonite along with some kainite, $KCl \cdot MgSO_4 \cdot 3H_2O$. These mixed salts are recycled to the reaction vessel where the reaction between langbeinite and potassium chloride takes place. By recycling the mixed salts to the initial reaction vessel, the recovery of potash from langbeinite is improved and the overall process is more efficient than the process of U.S. Patent 2,295,257.

Heretofore, the liquor remaining following the removal of mixed salts has been discarded as waste or treated to recover the magnesium values therefrom. The potash values, if recovered at all, were recovered as low grade potassium salts, such as kainite. In accordance with the instant invention, the liquor remaining following the removal of the mixed salts, which liquor will be termed "potassium sulfate reject liquor," is treated in a manner to permit the recovery of magnesium values therefrom, but is also treated to recover a major proportion of the potassium values therefrom in the form of high grade potassium salts, such as leonite.

In accordance with a specific embodiment of the instant invention, between about 60% and about 70% of the potassium values contained in potassium sulfate reject liquor are recovered as potassium sulfate.

It is an object of the instant invention to increase the overall recovery of potash values from langbeinite.

It is another object of this invention to recover the potassium values from kainite containing substantial amounts of sodium chloride.

It is a further object of this invention to provide a process for recovering potash values from potassium sulfate reject liquor.

In accordance with the general process of this invention, kainite containing a substantial quantity of sodium chloride is treated with just sufficient water to dissolve all of the sodium chloride, and the resulting slurry is agitated at a temperature between about 20° C. and about 60° C. until the slurry reaches substantial equilibrium. The kainite is converted to leonite by the water treatment and may be separated from the liquor by filtration. The leonite may be used directly for fertilizer purposes or may be converted in accordance with a specific embodiment of this invention to potassium sulfate.

In accordance with a specific embodiment of this invention, potassium values in potassium sulfate reject liquor may be recovered in the form of potassium sulfate. The potassium sulfate reject liquor, which contains essentially sulfate, chloride, magnesium and potassium ions, is reacted with carnallite, $KCl \cdot MgCl_2 \cdot 6H_2O$, suspended in an aqueous medium saturated with respect to magnesium chloride, the reaction taking place at a temperature between about 60° C. and about 85° C. When the reaction is substantially complete, solids comprising kainite salts which are formed during the reaction are separated from the mother liquor. The mother liquor from which the kainite salts have been removed contains substantial quantities of magnesium chloride. This mother liquor is evaporated to a point near saturation with respect to bischofite $$(MgCl_2 \cdot 6H_2O)$$

that is, to a magnesium chloride concentration of between about 36% and about 40%, by weight. Evaporation is usually carried out at a temperature above about 60° C., preferably at a temperature between about 115° C. and about 120° C. The resulting mixture is then cooled and thickened, preferably at a temperature of about 90° C., which is the maximum temperature for this thickening step. However, temperatures below about 90° C. may also be employed for the thickening step. If the evaporation is carried out at a temperature above about 90° C., the concentrated mixture is cooled and thickened at a temperature below about 90° C. If the evaporation is carried out at a temperature below about 90° C., the slurry is thickened at the evaporating temperature without additional cooling. The underflow from the thickener containing carnallite is recycled to the potassium sulfate reject liquor reaction.

It is important that the potassium sulfate reject liquor prior to its reaction with carnallite be adjusted with an alkaline compound, such as, for example, sodium hydroxide, to a pH of between about 5.5 and about 6.5, preferably to a pH of about 6.0. If the potassium reject liquor has a pH substantially below 6.0, for example a pH of about 4 or less, considerable corrosion of equipment occurs and equally, if not more important, the kainite salts formed as a result of the reaction between the carnallite slurry and a highly acidic reject liquor are very difficult to filter. If, however, the potassium sulfate reject liquor is adjusted to a pH between about 5.5 and about 6.5, the kainite salts formed are very easily filterable.

The kainite formed by the reaction between carnallite and potassium sulfate reject liquor, upon separation from the mother liquor, is filtered to remove any excess liquid which may be present. The kainite contains substantial amounts of sodium chloride and the concentration of the sodium chloride will usually range from between about 5% to about 20% or more based on the total solids. Ordinarily, there will be between about 10% and about 20% sodium chloride present based on the weight of the solids.

According to one embodiment, kainite containing the sodium chloride as an impurity is admixed with sufficient water to dissolve all the sodium chloride present and to produce a liquid phase substantially saturated with sodium chloride. Ideally, the liquid phase will be completely saturated with sodium chloride and there will be no sodium chloride in the solid phase. While this condition is difficult to attain in practice, it should be approached as closely as possible if best recoveries are desired. The slurry is then agitated at a temperature between about 20° C. and about 60° C. for at least about one-half hour. During this time, the kainite is substantially entirely converted to leonite.

If it is desirable, schoenite can be produced in place of leonite by increasing the amount of water added to the kainite. It is preferred, however, that leonite be produced during this step in the process for the reason that the production of leonite increases $K_2O$ recovery. The additional water added to the kainite cake for the production of schoenite dissolves potash, thereby decreasing recoveries.

The mother liquor remaining following the separation of leonite or schoenite from the kainite-water reaction is not discarded as waste. This mother liquor which may contain between about 8% and about 10% potassium chloride may be added to the brine circuit of a potassium chloride flotation process as "makeup brine," whereby substantially all of the potassium values may be recovered therefrom, or a saving of solid phase potassium chloride in the ore feed is effected due to the fact that the water or brine so added is already partially saturated with respect to potassium chloride.

The leonite or schoenite produced by the kainite-water reaction can be recycled directly to the reaction between langbeinite and aqueous potassium chloride solution. However, the mixed salts hereinabove mentioned are also recycled to this reaction and the separate introduction of the mixed salts and leonite or schoenite increases substantially the difficulty of maintaining the overall process within its prescribed reaction conditions. It is preferred that the leonite or schoenite produced from the kainite-water reaction be uniformly admixed with the mixed salts prior to addition to the langbeinite-potassium chloride reaction. By operating in this manner, there are no additional variables to be controlled and there is no problem in maintaining the essential reaction conditions throughout the overall process.

The potassium sulfate reject liquors utilized in this invention are illustrated by the reject liquors produced and processes such as are described and claimed in U.S. Patent 2,295,257 to Butt et al. and U.S. Patent 2,684,285 to Dancy. A typical potassium sulfate reject liquor suitable for the practice of the instant invention contains between about 5.3% and about 6.7%, by weight, of potassium chloride, between about 1.8% and about 3.3%, by weight, of sodium chloride, between about 6.2% and about 7.5%, by weight, of magnesium sulfate, between about 15.5% and about 18.3%, by weight, of magnesium chloride, and between about 66.0% and about 68%, by weight, of water.

In the kainite formation step sufficient carnallite slurry, the liquid phase of which is substantially saturated with magnesium chloride, is added to the potassium sulfate reject liquor so that the resulting mixture will be slightly less than saturated with respect to carnallite, for example, kainite is obtained by mixing between about 1.15 parts and about 1.35 parts, by weight, of potassium sulfate reject liquor per part of carnallite slurry. Kainite is formed in the above described slurry at a temperature between about 10° C. and about 85° C. Although kainite is formed in the slurry throughout the entire temperature range mentioned, the rate of formation of kainite is sufficiently rapid to be commercially feasible only at temperatures above about 60° C. The kainite salts which are separated from the solution have a $K_2O$ content of about 22% and magnesium oxide content of about 15%. The kainite-forming reaction is carried out until the formation of kainite is substantially complete. This usually requires between about 2 hours and about 4 hours. The kainite salts produced by the reaction between carnallite and potassium sulfate reject liquor have a typical analysis after washing and drying as follows:

| | Percent by weight |
|---|---|
| Potassium chloride | 34.97 |
| Magnesium sulfate | 44.67 |
| Sodium chloride | 19.77 |

About 93% of the potash values in the potassium sulfate reject liquor are present in the kainite salts.

For a more complete understanding of the instant novel process reference may be had to the figure which is a flow sheet of a preferred embodiment of the instant process. In the flow sheet langbeinite 1 is allowed to enter a reaction tank 3 by line 2, water 6 is added by line 7 and an aqueous potassium chloride solution 4 is added to the reaction tank 3 by line 5. Mixed salts 23 enter the reaction tank 3 by line 24. The mixture is agitated and allowed to react at about 60° C. for a period of time sufficient to allow the reaction to reach equilibrium. After completion of the reaction, the reaction mixture is transferred to filter 9 by line 8 and the solid potassium sulfate product 11 is removed from filter 9 by line 10. The solid potassium sulfate product 11 is conveyed to the dryer and storage 13 by line 12.

The filtrate 15 is removed from filter 9 by line 14 and is conveyed to evaporator 17 by line 16 where it is evaporated to a point just short of the crystallization of sodium chloride and/or magnesium chloride when the liquid is at room temperature. The evaporation is preferably carried out below the atmospheric boiling point of the mother liquor.

The concentrated mother liquor is then transferred to crystallizer 19 by line 18 where it is quickly cooled to about 55° C. The resultant crystalline mixture is conveyed to thickener 21 by means of line 20 where mixed salts 23, comprising essentially potassium chloride, kainite and leonite, are separated and removed by line 22. The overflow 26 from thickener 21, which is potassium sulfate reject liquor, is removed from thickener 21 by means of line 25 and transferred to reaction tank 28 by line 27. Carnallite slurry 29 is added to reaction 28 by line 30. The potassium sulfate reject liquor 26 is reacted with carnallite slurry 29 in reaction tank 28 at a temperature between about 60° C. and about 85° C. until the kainite-forming reaction is substantially complete. The reaction product mixture is then transferred to thickener 32 by line 31 where solution 34, comprising a concentrated magnesium chloride solution, is separated from an underflow slurry in which the solid phase comprises essentially kainite and sodium chloride with a small amount of potassium chloride. This underflow slurry 36 is removed from the thickener 32 by line 35. The underflow slurry 36 is transferred to filter 38 by line 37, and the filtrate is recycled to thickener 32 by line 39. The filter cake 41, comprising essentially kainite and sodium chloride, is transferred to reaction tank 43 by line 42 and reacted with water 53 entering the tank 43 by line 54. Sufficient water is added to produce a slurry having a liquid phase substantially saturated with sodium chloride and with substantially no sodium chloride in the solid phase. The specific gravity of the slurry will usually be between about 1.40 and about 1.45. The temperature of the reaction mixture in reaction tank 43 is maintained between about 20° C. and about 60° C., preferably between about 25° C. and about 50° C., and the reaction mixture is agitated until substantially all of the kainite is converted into leonite. Following completion of the reaction, the reaction product mixture is conveyed to centrifuge 45 by line 44.

Centrifuge 45 separates liquor 47, containing dissolved potassium chloride, sodium chloride and magnesium salts, by line 46. This liquor may be added to the tailing circuit of a potassium chloride flotataion process whereby substantially all of the potassium chloride may be recovered. Centrifuge 45 also separates solids 49 by line 48, these solids comprising essentially leonite or schoenite depending upon the reaction conditions employed in reaction tank 43. Solids 49 are conveyed by lines 50 and 52 directly to the reaction tank 3 or preferably, to thickener 21 by lines 50 and 51. The latter procedure is preferable in that the leonite or schoenite is uniformly mixed with the mixed salts issuing from thickener 21 by line 22 and this uniform mixture is then recycled to reaction tank 3 by line 24. By operating in this latter manner, the number of variables entering reaction tank 3 is reduced, facilitating the maintenance of the essential reaction conditions necessary for the efficiency of the overall recovery process. By operating in accordance with the present invention, substantially all of the potassium values contained in the langbeinite starting material are recovered in the form of potassium sulfate. If it is desired, however, the leonite or schoenite produced in reaction tank 43 and separated from the reaction product mixture by centrifuge 45 may be utilized directly as a fertilizer material. It is preferable, however, that the potassium values in the leonite or schoenite be recovered as the higher grade and more valuable potassium sulfate.

The following examples illustrate specific embodiments of this invention. All parts and percentages are by weight unless otherwise indicated.

EXAMPLE I

About 121 parts by weight of potassium sulfate reject liquor 26, having the composition indicated in Table 1, was added to about 100 parts by weight of a thickened slurry of crude carnallite salts 29 of the composition indicated in Table 1. The resulting mixture was agitated in reaction tank 28 at a temperature of about 65° C. until the sulfate concentration of the liquor had been reduced to below about 2%. The reaction mixture was thickened in a conventional type thickener 32 at a temperature of about 90° C. The overflow was a magnesium chloride solution 34, which was suitable for processing to recover the magnesium values therefrom. The underflow 36 was filtered to separate solids and the filtrate was recycled to thickener 32. The filter cake comprised essentially kainite and sodium chloride.

*Table 1*

ANALYSIS OF MATERIALS

| Material | Temp., °C. | Weight, percent | | | | | |
|---|---|---|---|---|---|---|---|
| | | K | Mg | Na | Cl | SO$_4$ | H$_2$O |
| Reject liquor 26 | | 3.40 | 5.44 | 1.12 | 16.84 | 5.19 | 68.01 |
| Carnallite slurry 29 | 90 | 6.01 | 8.94 | 1.29 | 32.20 | 1.78 | 49.78 |

EXAMPLE II

About 800 parts of a kainite filter cake 41 prepared as above and having the composition shown in Table 2 was admixed with about 600 parts water for about 1 hour at 30° C. All of the sodium chloride present was dissolved. The slurry was centrifuged and samples of the solids cake 49 and filtrate 46 analyzed and found to have the composition shown in Table 2. Microscopic examination showed that the cake consisted of leonite only. About 1025 parts of liquor and about 375 parts of wet filter cake were recovered.

*Table 2*

| Material | Weight, percent | | | | | |
|---|---|---|---|---|---|---|
| | K | Mg | Na | Cl | SO$_4$ | H$_2$O |
| Kainite cake 41 | 10.56 | 8.38 | 4.18 | 19.00 | 29.23 | 28.65 |
| Leonite cake 49 | 16.11 | 5.64 | 0.63 | 2.96 | 39.30 | 35.36 |
| Filtrate 46 | 2.70 | 4.36 | 3.24 | 13.68 | 8.81 | 67.11 |

EXAMPLE III

Kainite filter cake 41 produced as in Example I from potassium sulfate reject liquor 26 in the amount of 800 parts and having the composition shown in Table 3 was agitated with about 575 parts of water. The slurry was agitated for about 1 hour at 30° C. and all of the sodium chloride present was dissolved. The reaction product mixture was filtered and samples of the filter cake 49 and filtrate 46 analyzed. The cake consisted of leonite only. Table 3 shows the composition of the filter cake and filtrate. The leonite was admixed with mixed salts and recycled to a langbeinite-potassium chloride solution reaction tank. By operating in this manner, about 80% of the potassium values in potassium sulfate reject liquor was recovered as potassium sulfate.

*Table 3*

| Material | Weight, percent | | | | | |
|---|---|---|---|---|---|---|
| | K | Mg | Na | Cl | SO$_4$ | H$_2$O |
| Kainite cake 41 | 10.56 | 8.38 | 4.18 | 19.00 | 29.23 | 28.65 |
| Leonite cake 49 | 16.19 | 5.80 | 0.67 | 2.80 | 40.63 | 33.91 |
| Filtrate 46 | 2.65 | 4.60 | 3.28 | 14.52 | 8.79 | 66.19 |

The terms "langbeinite," "leonite," "schoenite," "kainite," "carnallite," and "bischofite" used in the present description and claims are to be understood as referrring to substances having the composition designated hereinabove after the first occurrence of each of said terms.

Having thus fully described and illustrated the character of the instant invention, what is desired to be secured by Letters Patent is:

1. In a process for recovering potassium values from kainite containing between about 5 and about 20% by weight of sodium chloride, based on total solids, the steps which comprise admixing said kainite with water in an amount sufficient to dissolve all of the sodium chloride and to produce a slurry in which the liquid phase is substantially saturated with sodium chloride while the solid phase contains substantially no sodium chloride, agitating the resulting slurry at a temperature between about 20 and about 60° C., whereby the sodium chloride is dissolved and the kainite is converted into leonite, continuing said agitation for at least about 0.5 hour and until said conversion is substantially complete, and separating said leonite as the solid phase from the reaction product mixture.

2. The process of claim 1 wherein said slurry is agitated at a temperature between about 25 and about 50° C.

3. The process of claim 1 wherein said kainite containing between about 5 and about 20% by weight of sodium chloride as an impurity is obtained by treating a potassium sulfate reject liquor containing essentially sulfate, chloride, magnesium and potassium ions with carnallite suspended in an aqueous medium substantially saturated with respect to magnesium chloride at a temperature of between about 60 and about 85° C., and separating said kainite, containing between about 5 and about 20% by weight of sodium chloride as an impurity, as the solid phase from the resulting mixture upon substantial completion of the reaction.

References Cited in the file of this patent

UNITED STATES PATENTS

| | | |
|---|---|---|
| 1,589,519 | Dolbear | June 22, 1926 |
| 1,794,553 | Schoch | Mar. 3, 1931 |
| 2,684,285 | Dancy | July 20, 1954 |
| 2,687,339 | Dancy et al. | Aug. 24, 1954 |

OTHER REFERENCES

Mellor: "Comprehensive Treatise on Inorganic and Theoretical Chemistry," vol. 4, pages 340, Longmans, Green and Co., 1923, vol. 2, page 431, 1923.

Hackh's Chemical Dictionary, published by P. Blakiston, Son and Co., Inc., Philadelphia, 2nd ed., page 513, 1937.

Dana's Manual of Mineralogy (Ford), published by John Wiley and Sons, Inc., New York, 14th ed., page 181 (1929).